June 7, 1938.   R. E. DAY   2,120,090

PISTON

Original Filed July 15, 1935

Inventor:
Ray E. Day
By Dike, Calver & Gray
Attorneys.

Patented June 7, 1938

2,120,090

UNITED STATES PATENT OFFICE 2,120,090

PISTON

Ray E. Day, Detroit, Mich.

Application July 15, 1935, Serial No. 31,438
Renewed November 1, 1937

1 Claim. (Cl. 309—11)

This invention relates to pistons for internal combustion engines and particularly, although not exclusively, to pistons which may be formed from aluminum alloys.

An object of the present invention is to provide a piston in which the opposed thrust faces are joined to the boss carrying supports by pairs of struts which diverge from the thrust faces to the bosses in such manner as to enable the thrust faces of the skirt to contract or yield inwardly under cylinder wall pressure.

A further object of the invention is to provide a piston of the foregoing character in which the struts may be shortened in length without, however, reducing the skirt diameter or sacrificing bearing area of the thrust faces or the yieldability thereof, while at the same time providing a construction which may be economically cast.

A further object of my invention is to provide an improved piston of relatively light weight, which is inexpensive to manufacture, and one having superior wearing qualities, performance and durability.

Pistons of the foregoing character and particularly those having diverging struts are so designed that the struts produce the so-called "toggle effect" on the thrust bearing or skirt portions and tend to pull them inwardly as the boss carrying supports move outwardly because of the expansion of the heated piston head. Said "toggle action" of the struts presumably prevents the objectionable "swelling" of the skirt resulting from heating and prevents increasing of the piston diameter. It has been found, however, that strut pistons are not always smooth in operation, and that some types of such pistons particularly those having skirts with wing portions wear out their thrust bearing sections and wear down the engine cylinders very rapidly. I have found that the cause of the above difficulties lies in the lack of provisions for enabling the struts to perform the function intended without producing certain detrimental results, hereinafter explained in detail, which results may completely destroy the beneficial effect of the struts.

In the pistons in which the struts join the thrust bearing portions at a certain distance from the middle of said portions, the toggle action of the struts produces besides inward pull also outwardly acting component forces, which forces press the extreme edges of the thrust bearing outwardly, thus tending to unbend the arcuate thrust bearing portions or to increase the radius of their curvature. In other words, the toggle action of the struts results in pulling inwardly only the very middle of the thrust bearing portions, while their extreme sections and wings are pressed against the cylinder wall with a greatly increased pressure which produces rapid wearing of pistons and engine cylinders because of high localized pressure on the pistons and cylinders. It is clear that the above difficulties cannot be eliminated by making the thrust bearing portions very narrow, since this would decrease the bearing areas of the thrust portions.

Other objects of this invention will appear in the following description and appended claim, reference being had to the accompanying drawing forming a part of this specification wherein like reference characters designate corresponding parts in the several views.

Figure 3:
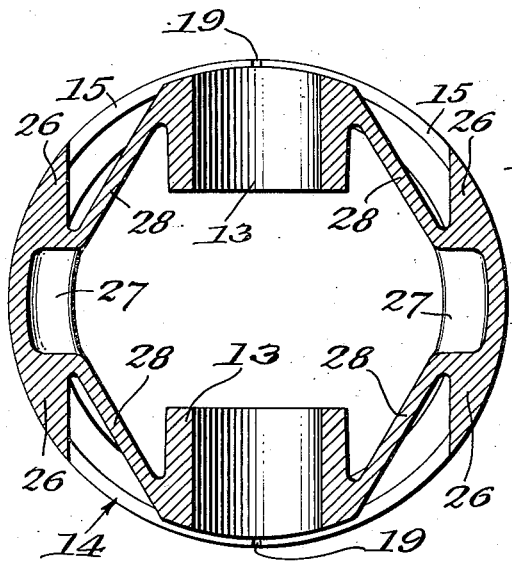
Fig. 3 is a horizontal sectional view of a modified form of piston.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

As herein illustrated by way of example, a piston embodying my invention may comprise a head 10 provided with piston ring grooves 11. Depending integrally from the head at opposite sides of the piston are internally ribbed supports or hangers 12 carrying piston pin bosses or bearings 13. The outer faces of these supports are relieved throughout their length to provide sufficient clearance against contact with the cylinder wall when the bosses move outwardly by thermal expansion or by toggle action of the diverging struts, as hereinafter described.

The piston skirt, shown as a whole at 14, may comprise, as in the present example, two substantially identical slipper sections or thrust bearing portions 15. The slipper sections, below the boss carrying extensions 12, are extended annularly to provide bearing ring portions separated from the extensions 12 by slots 18 and from each other by short vertical slots 19. The slipper sections are reinforced and stiffened by means of deep arcuate ribs 16 and the lower bearing ring portions preferably terminate in stiffening flanges 17. The skirt or slipper sections are separated from the head by means of through slots 20. The upper end of each slipper section is provided with an internal reinforcing flange or rib 21 and this portion of the skirt is extended at opposite ends in a direction toward the piston bosses to provide overhanging wings 22 which serve as extended bearing portions assisting in preventing side rock of the piston in the cylinder.

Figure 2:
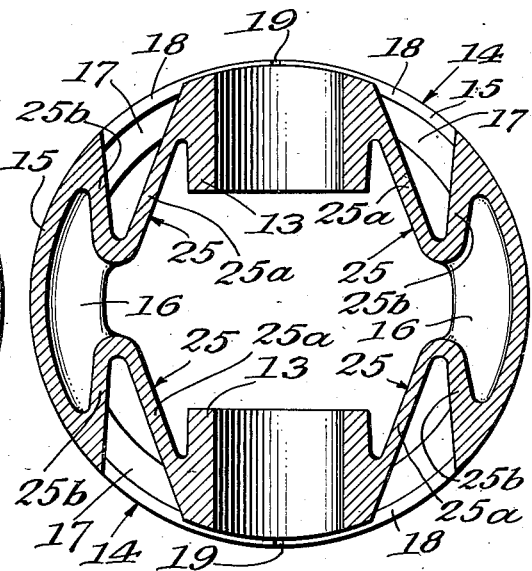
Fig. 2 is a horizontal sectional view taken substantially along the line 2—2 of Fig. 1.

Referring particularly to Fig. 2, it will be seen that the slipper sections are supported entirely by the piston pin bosses through the medium of strut members 25. These strut members are shown as substanially V-shaped forming in effect a goose-neck construction. One leg 25a of each strut member extends inwardly and angularly from the boss toward the slipper section and is reversed to provide a leg 25b which extends outwardly and joins the side edge of the thrust face or bearing surface of the slipper section. It is to be noted that the leg 25a may be made thinner and hence somewhat more flexible than the leg 25b of each strut member. The V-shaped construction of the strut members permits the use of short diverging strut portions 25a without decreasing the piston diameter and at the same time provide strut portions 25b which, by reason of their connection to the extreme side edges of the slippers, stiffen the skirt against distortion.

It will be seen that the V-shaped struts 25 may be readily formed during the casting of the piston by the use of wedge or V-shaped inserts in the mold. When the metal is poured into the mold these inserts occupy and form the V-shaped cavities 18 at opposite sides of the bosses. Due, therefore, to the fact that the opposed outer faces of each strut 25 extend in diverging planes it will be seen that the wedge shaped mold inserts may be readily withdrawn, after the metal has set, in straight line paths. Each pair of mold inserts at opposite sides of each boss will be removed from the cavities 18 by shifting them in converging rectilinear paths.

A further important aspect of the present invention resides in the fact that the outwardly diverging pairs of strut members 25a, although materially fore-shortened by the goose-neck design of the strut, may be arranged at relatively flat angles. For example, the struts 25a connected to each slipper section may be placed, as in the present instance, so that their included angle is as great as 125°. For most satisfactory results during operation, particularly in high speed engines, this angle is preferably from 120° to 140° and in any case should not be less than 100°. This flat or wide angle of the struts has an important advantage in increasing the efficiency of the piston and preventing seizure and scoring under conditions of excessive skirt expansion.

It will be understood that during operation of the engine the head of the piston ordinarily becomes much hotter than the skirt. Although heat conduction from the head is retarded by the slots 20, yet a considerable amount of heat travels through the supports 12 and struts 25 to the skirt, particularly during high speed operation, causing expansion of the skirt. The skirt, therefore, will expand varying degrees during operation and frequently will "swell up" within the cylinder and press excessively against the cylinder walls. This is especially likely to occur in cases where the piston is initially fitted with small clearance. Said "swelling up" of the skirt because of the thermal expansion thereof is still more increased in conventional structures by the "unbending" effort of the diverging struts. In my improved piston "unbending" of the skirt sections 15 is prevented by the deep arcuate ribs 16 which make said sections 15 rigid enough to resist such "unbending" effort of the struts.

In addition to the above, said arcuate ribs 16 perform another important function. It will be readily understood from an examination of the drawing that said ribs 16 present a substantial area to the cooling action of the crankcase oil and air and therefore operate at relatively lower temperatures than the periphery of the skirt. The difference in temperature causes warping or bending of the skirt sections 15 to a smaller radius, thus counteracting the result of the thermal expansion and of the small but inevitable unbending of the reenforced skirt by the struts. Thus, in spite of the thermal expansion of the thrust bearing portions and the "unbending" effort of the diverging struts, said thrust bearing portions preserve substantially constant radius of curvature throughout the entire range of operation temperatures.

The flexibility or yieldability of the struts 25 is enhanced sufficiently by the flat angle of portions 25a so that they will flex and tend to flatten as a result of cylinder wall pressure exerted on the slipper sections.

It is important to note that the connecting rod side thrust pressures are only applied alternately to one slipper section and then to the other—not to both slippers or bearing faces at the same time—whereas the cylinder wall pressures consequent to excessive thermal expansion of the skirt as a whole are applied simultaneously to both slippers or bearing faces. Hence, the present piston is designed (for a given engine) with such a strut angle, such as 125°, that the maximum connecting rod side thrust will not flex the struts 25 appreciably, acting only on one bearing face at a time. Yet, the angularity of the struts is such that when the piston "swells up" in the cylinder and compression forces from the cylinder wall are directed simultaneously against both skirt sections, then the struts 25 will yield sufficiently to relieve the skirt and prevent high friction or seizure which might otherwise occur.

Since flexibility of the struts and the stiffness of their "toggle" action depend on their included angle, it is clear that said included angle should be so selected that the struts are not too rigid to yield to the bending effort of the thermally responsive ribs. I have found that pistons with included angle less than 100° do not operate satisfactorily.

Inward flexing of the struts under cylinder wall pressure is, of course, resisted by the bosses to which the inner ends of the struts are joined. In order to realize the desired degree of relief of the skirt under compression forces from the cylinder when the skirt expands as a whole, it is, therefore, desirable that these forces be sufficient, when transmitted through the struts, to spring the bosses apart slightly. The design, therefore, is preferably such that the connecting rod side thrust pressure on only one side of the skirt is insufficient to flex the struts appreciably or to spring the bosses apart, whereas the cylinder wall compression forces acting on both slipper sections will be sufficient to accomplish this. Thus, where the pressures are exerted on both slipper sections at once, being at least double the pressure of the connecting rod side thrust, the result will be a slight flattening of the struts and a slight springing apart of the bosses, and thereby relieving the bearing faces sufficiently to avoid scoring or seizure.

Hence, the wide strut angle provides an important safety factor, yielding under compound compression forces exerted on the skirt sections consequent to unusual conditions of piston expansion, thereby avoiding skirt distortion, and preventing high friction, scuffing or seizure. The skirt sections may, therefore, be heavily ribbed and reinforced to maintain the curvature thereof, and the piston may be made stiff enough to withstand all the loads and forces imposed upon it without any danger of collapse or going out of shape, while at the same time all danger of scoring or seizing within the cylinder is eliminated.

Figure 1:
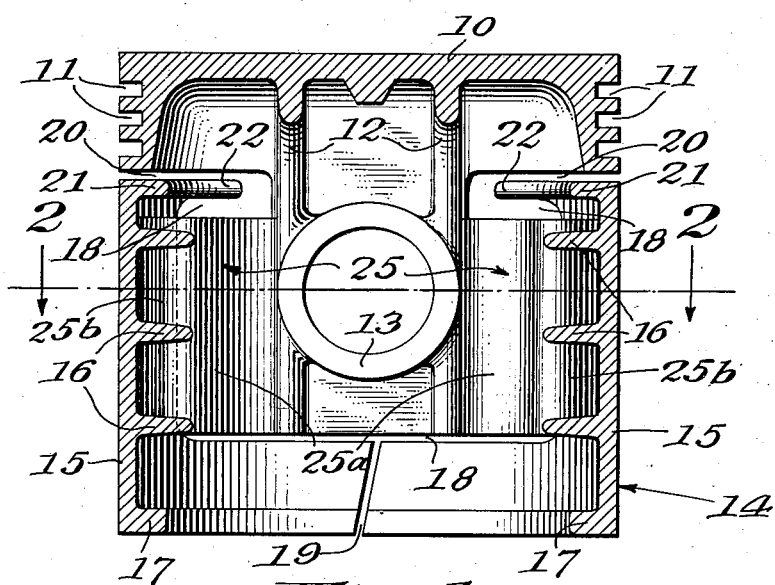
Fig. 1 is a vertical sectional view of a piston embodying my invention.

Referring particularly to the modified piston shown in Fig. 3, it will be noted that the bearing portions or thrust faces 26 of the slipper sections are relatively heavier than those of Figs. 1 and 2. In this form, internal reenforcing ribs 27 are employed, and relatively straight strut members 28 extend from the piston pin bosses to the thrust faces at points removed from the side edges thereof. The slipper sections are likewise separate and independent of one another and are divided at the lower ends by the vertical slots 19.

It will be seen that the included angle of adjacent struts 28 in this form of piston is somewhat less than in the piston of Fig. 2 and that the piston is materially stiffer. This design of piston, however, also has the advantage of easy casting by the use of V or wedge shaped mold inserts which may be withdrawn in straight line directions from the mold after the casting has been formed.

This application is a continuation in part of my co-pending application, Serial No. 91,407, filed March 1, 1926.

I claim:

A piston comprising a head, a pair of opposite boss carrying supports depending from the head, a pair of opposed arcuate skirt sections separated from each other and from said head, said sections being circumferentially continuous across their bearing faces, a pair of struts integrally joining each skirt section and said supports and having inwardly converging portions extending substantially from the outer edges of the skirt section, said converging portions terminating in bends and inwardly diverging portions extending from the bends to the outer sides of the boss carrying supports, said diverging portions of each pair of struts being arranged at such an angle relative to each other as to effect by toggle action a tendency to draw the skirt sections inwardly when said boss carrying supports tend to move apart as a result of thermal expansion of the head, and each skirt section having an integrally formed inwardly projecting rib connecting said converging strut portions for resisting any tendency of the struts to increase the radius of curvature of the skirt section upon exerting said toggle action.

RAY E. DAY.